(12) United States Patent
Sosnowski

(10) Patent No.: US 6,434,969 B1
(45) Date of Patent: Aug. 20, 2002

(54) POSITIVE PRESSURE HEAT PUMP SYSTEM AND METHOD

(76) Inventor: Leon Sosnowski, 6645 N. 78 Pl., Scottsdale, AZ (US) 85250

( * ) Notice: Subject to any disclaimer, the term of this patent is extended or adjusted under 35 U.S.C. 154(b) by 0 days.

(21) Appl. No.: 09/689,699

(22) Filed: Oct. 13, 2000

(51) Int. Cl.⁷ .............................................. F25D 17/06
(52) U.S. Cl. ........................... 62/419; 62/427; 62/411; 62/426
(58) Field of Search ....................... 62/407, 411, 419, 62/426

(56) References Cited

U.S. PATENT DOCUMENTS

| | | | |
|---|---|---|---|
| 4,034,801 A | | 7/1977 | Bernstein |
| 4,420,036 A | * | 12/1983 | Blaser .......................... 165/45 |
| 4,437,511 A | * | 3/1984 | Sheridan ...................... 165/485 |
| 4,505,327 A | * | 3/1985 | Angle et al. .................. 165/48 |
| 4,678,025 A | | 7/1987 | Oberlander et al. |
| 4,938,035 A | | 7/1990 | Dinh |
| 5,348,077 A | | 9/1994 | Hillman |
| 5,715,701 A | * | 2/1998 | Kreymer ........................ 62/419 |
| 5,855,320 A | | 1/1999 | Grinbergs |
| 5,970,723 A | * | 10/1999 | Kinkel et al. .................. 62/121 |
| 6,156,268 A | * | 12/2000 | Curry et al. ................... 422/4 |
| 6,185,943 B1 | * | 2/2001 | Kopko ............................ 62/89 |
| 6,272,880 B1 | * | 8/2001 | Miki et al. ..................... 62/404 |

* cited by examiner

Primary Examiner—William C. Doerrler
Assistant Examiner—Mark Shulman
(74) Attorney, Agent, or Firm—Bradford Kile; Kile Goekjian Lerner & Reed

(57) ABSTRACT

A positive pressure heat pump system and method wherein a heat pump is housed within a cabinet having an outdoor blower section and a segregated indoor blower section. The heat pump condensing coil is positioned within the outdoor air blower section and a cooling coil is positioned within the indoor blower section. A variable angle vane is operable to divert pressurized and heated outdoor air, downstream of the condensing coil, from the outdoor air blower section into the indoor air blower section, upstream of the cooling coil, so that cooled and pressurized air is recycled into the interior of a building to maintain a positive pressure within the building relative to the surrounding ambient environment.

14 Claims, 3 Drawing Sheets

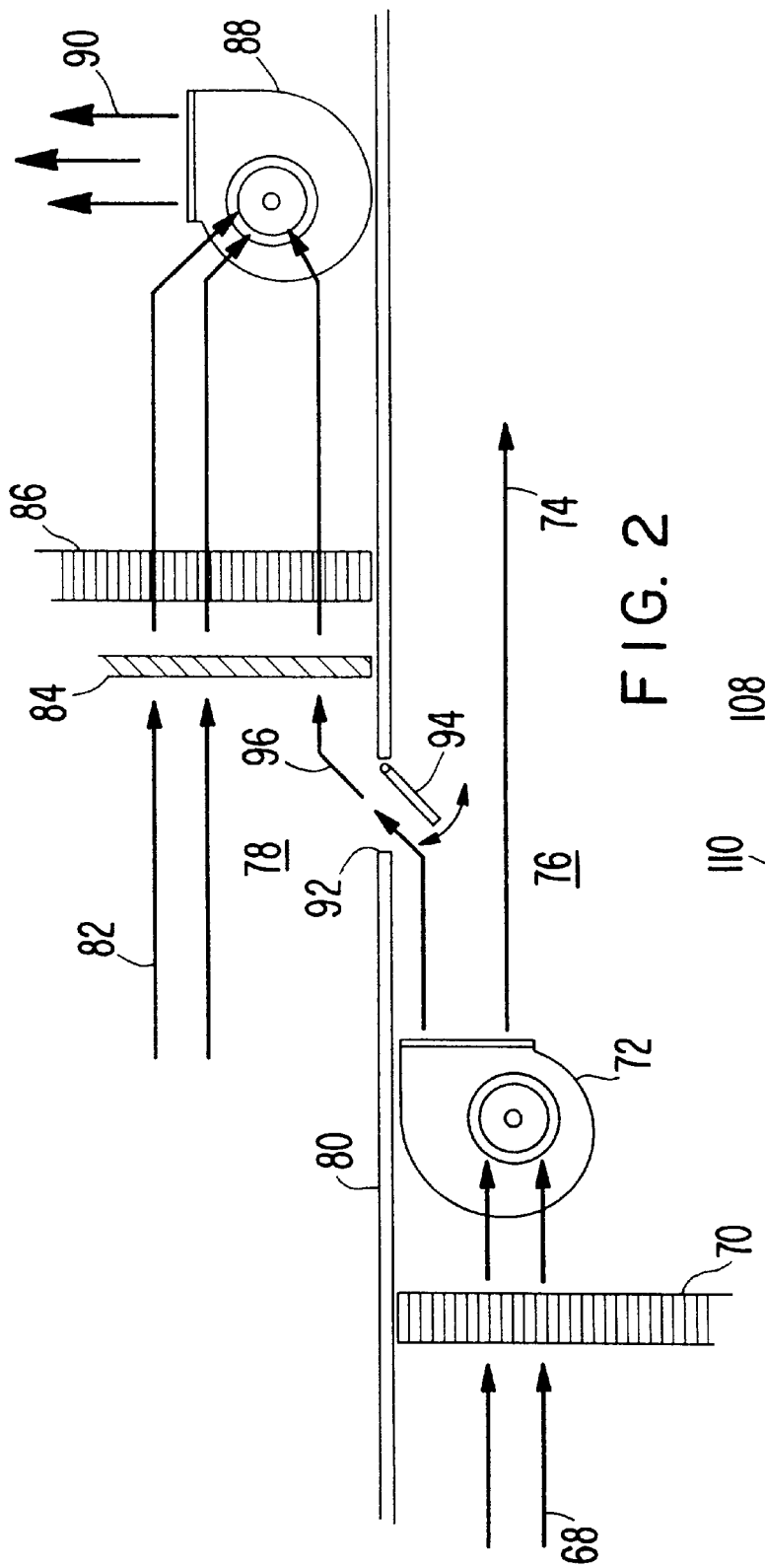

POSITIVE PRESSURE HEAT PUMP SYSTEM AND METHOD

BACKGROUND OF THE INVENTION

This invention relates to an enhanced air handling system and method for creating an energy efficient and healthful building environment. More specifically, this invention relates to a novel positive pressure heat pump that uses heated and pressurized outside air to elevate the internal pressure within a building structure.

In the past, air handling and conditioning systems have been known that heat or cool air within a building or home environment for the occupant's comfort and safety. One type of previously known air handling system which has been widely utilized in home heating and in some small buildings is referred to as a heat pump.

A heat pump system is a closed fluid system driven by an electric powered compressor or pump. Fluid enters the compressor as a vapor and is compressed. During compression the fluid experiences an increase in pressure and temperature which is much greater than external ambient environments. The pressurized fluid then passes into a condensing coil where ambient air, less than the temperature of the vapor within the condenser, absorbs heat from the heat pump system and air outside the condensing coil is heated. During the condensing operation the internal vapor leaves as a liquid, still at a high pressure. The condensing coil is typically positioned outside of a user's home and a fan draws outside ambient air over and through the condensing heat exchanger or coil and the heated air is merely blown into the atmosphere at an elevated temperature.

The internal heat pump liquid then flows through an expansion valve where the liquid squirts into a relatively low pressure area. This reduction in pressure results in the liquid turning into a vapor and absorbing considerable heat in accordance with the physical laws of the latent heat of vaporization. A liquid vapor mixture then flows through another heat exchanger called an evaporator or cooling coil and heat from the indoor air is drawn into the cooler heat exchanger or cooling coil and thus into the heat pump system. A blower or fan then delivers the cooled inside air back into the interior of a home or building environment via air ducts.

Although heat pump air conditioning and handling systems are used to deliver, cool and condition indoor air flow, most homes and small offices have considerable air leakage around doors, windows fire places, etc. Since by a basis law of nature heat will flow from a hot body to a cooler body outside air, at an elevated temperature, continually moves into the interior of an air conditioned home environment. This flow brings air born dust, pollen, spores and the like into the home. In addition, in certain soil strata radon gas migrates into below-ground rooms of a home or small building. It would be highly desirable to provide a heat pump system that might obviate or minimize air born contaminants and gases entering into a home environment. Still further, it would be highly desirable to provide a heat pump system where noise pollution from operation of the system could be minimized.

The difficulties and limitations suggested in the preceding are not intended to be exhaustive, but rather are among many which demonstrate that although significant attention and energy have been devoted to improving features of heat pumps for decades, the features associated with the design and operation of heat pumps appearing in the past will admit to worthwhile improvement.

OBJECTS OF THE INVENTION

It is, therefore, a general object of the invention to provide a novel positive pressure heat pump system and method that will obviate or minimize problems of the type previously described.

It is a specific object of the invention to provide an energy efficient positive pressure heat pump system and method.

It is another object of the invention to provide a novel positive pressure heat pump method and system that will eliminate or minimize outdoor noise during operation.

It is yet another object of the invention to provide a novel positive pressure heat pump system and method that will provide an enhanced, healthful, home living environment.

It is a further object of the invention to provide a novel positive pressure heat pump system and method that will reduce a tendency of air born dust, pollen and/or spores from entering a living environment.

It is a related object of the invention to provide a novel method and system for reducing the rate at which radon gas may enter a home living enclosure.

It is another object of the invention to provide a novel positive pressure heat pump system and method which is operable to efficiently remove air born contaminants from an interior living environment.

It is still another object of the invention to provide a novel heat pump system and method that is compact and entirely contained with the interior space of a living environment.

BRIEF SUMMARY OF A PREFERRED EMBODIMENT OF THE INVENTION

A preferred embodiment of the invention, which is intended to accomplish at least some of the foregoing objects, includes a system and method wherein a positive pressure heat pump is fashioned within an enclosed cabinet operable to be positioned, compactly, and entirely within a building or home environment. The cabinet is divided in two distinct sections, an outdoor blower section and an indoor blower section. The outdoor blower section includes an inlet port operable to receive outdoor air flow form an outdoor environment and an exit port to expel the outdoor air flow. Interiorly, the outdoor blower section includes a condensing coil, a compressor and a radial vane, outdoor air blower. The indoor blower section includes an interior air return port and an indoor duct, air exit port. The indoor blower section houses an air filter, a cooling coil and an indoor radial vane, indoor air blower. A variable diverting plate is positioned downstream of the outdoor blower section compressor and the radial vane positive pressure air blower. Outdoor air is thereby selectively diverted, at an elevated pressure and temperature, from the outdoor air section to a position in front of the indoor blower section filter and cooling coil so that pressurized air is added to the interior environment of the system and maintains an interior environment of a home or building to maintain an interior positive pressure with respect to a surrounding ambient environment.

BRIEF DESCRIPTION OF THE DRAWINGS

Other objects and advantages of the present invention will become apparent from the following detailed description of a preferred embodiment thereof taken in conjunction with the accompanying drawings, wherein:

FIG. 2 is a schematic illustration of outdoor air flow and indoor air flow paths in accordance with the subject positive pressure heat pump system and method;

FIG. 5 (note again sheet 2) is a schematic illustration of a variable pressure diverting plate and adjustment mechanism to selectively vary the angle of the air diverting plate and thus the amount of positive pressure outdoor air diverted from a lower, outdoor air blower section into the upper, interior air blower section for filtering, cooling and blowing into the living environment.

DETAILED DESCRIPTION

Context of the Invention

Figure 1:
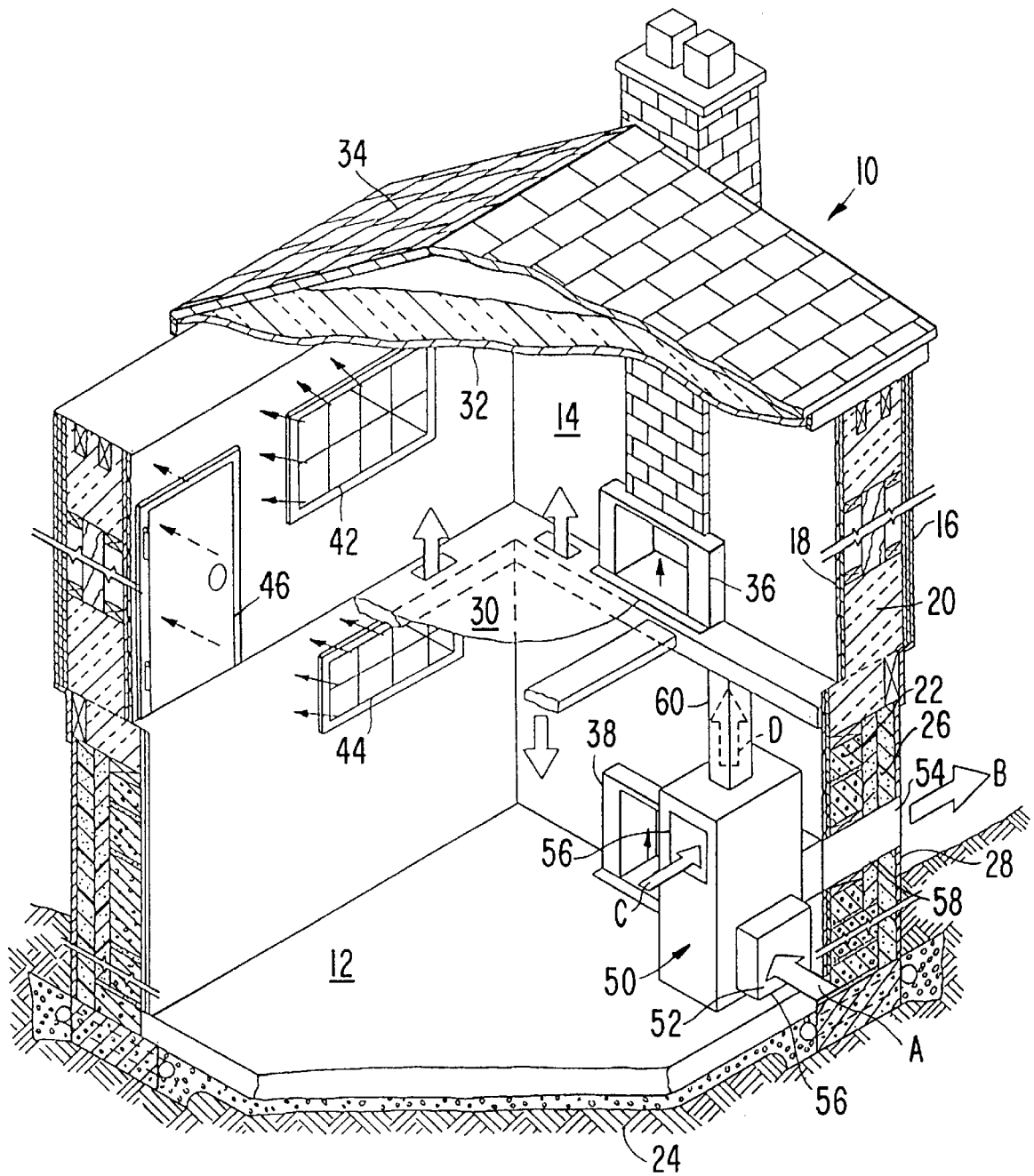
FIG. 1 is a schematic, axonometric view of a two story home, broken away to disclose interior detail, which depicts an operative environment of the subject positive pressure heat pump system and method.

Referring now to the drawings, wherein like numerals indicate like parts, FIG. 1 illustrates one presently preferred operating context of the invention.

One preferred operative context of the subject positive pressure heat pump system and method is a home environment such as schematically depicted in FIG. 1. A specific home design that is suited top utilize the subject invention is disclosed in applicant's prior U.S. Pat. No. 4,580,487. The disclosure of this patent is incorporated by reference as though set forth at length. Briefly, however, and with reference to FIG. 1, a two-story home 10 is disclosed having at least a partially below-grade first floor 12 and an upper floor 14. In a preferred form an upper, outer wall surface 16 is separated from an inner wall surface 18 by a distance of 8" to 12" and is filled insulation 20. AT a lower level 12, a cinder block wall 22 is built up from a concrete floor 24. Insulation 26 is positioned outside of the cinder block and is finished with an outer wall surface 28.

The second floor 14 has floor surface 30, a ceiling 32 and a conventional shingle roof 34. The house depicted in FIG. 1 has a conventional brick and block fireplace 36 on the upper floor 14 and a similar fireplace 38 on the lower floor 12. A single chimney 40 serves both units and dampers open from the fireplace well into open flue liners. The house has a complement of windows 42 on the upper level and half windows 44 on the lower level. The house further has one or more doors 46. Fireplaces, windows, doors, etc. of the house permit air to seep into the house and carry in house dust, pollen, spores and other contaminants. In addition, a house, as described above, is also subject to receiving radon gas, a known carcinogen, which collects at subterranean levels in the basement or first floor 12. The subject invention is a positive pressure heat pump unit 50 that is operably positioned completely within the house 10. In this, the heat pump unit 50 has an outdoor air inlet 52 and exit 54. These apertures, covered by grates, and ducts 56 and 58 provide an outside air in and out flow path, respectively. The flow of outside air is in the direction of arrow "A" and the exit is in the direction of arrow "B".

Within the interior of the house, an indoor air inlet 56 admits and returns indoor air into the heat pump 50 in the direction of arrow "C". Conditioned and filtered air is blown out of the top of the heat pump unit 50 via an exit duct 60 and into distribution ducts 62 and 64 which serve to distribute pressurized and conditioned air throughout the house.

Positive Pressure Heat Pump System

Turning now to FIG. 2, on sheet 2, there is a schematic diagram of components comprising a preferred embodiment of the subject invention. Within a heat pump cabinet 50, note again FIG. 1, outside air flows in the direction arrows 68, through a condensing heat exchanger 70 and into a radial vane outside air pump 72. The outside air is heated as it passes through the condenser 70 and is pressurized by the air pump 72. Most of the heated outside air is then blown in the direction of arrow 74 back into the ambient atmosphere.

A lower outdoor air blower section 76 is separated from an upper indoor air blower section 78 by a dividing wall 80 within the interior of the heat pump cabinet 50.

Return indoor air, represented by arrows 82, is drawn through a filter 84 and a cooling heat exchanger 86 by another radial vane pump 88. The filtered and cooled indoor air is returned to the house environment in the direction of flow arrows 90.

In order to increase the air pressure within the indoor system an aperture 92 is cut through the wall 80 and a variable angle diverter plate 94 serves to channel a portion of the heated and pressurized outside air downstream of the blower 72 in the direction of arrow 96. The heated and pressurized outdoor air is then filtered and chilled before it is introduced by the blower 88 into the indoor environment of the house. This added pressurized air serves to increase the indoor air pressure above the outdoor ambient air pressure and create a positive pressure interior environment. The degree of positive pressure depends on the number of sources of air leakage for a particular house and the volume of outside air diverted into the indoor air system.

Figure 4:
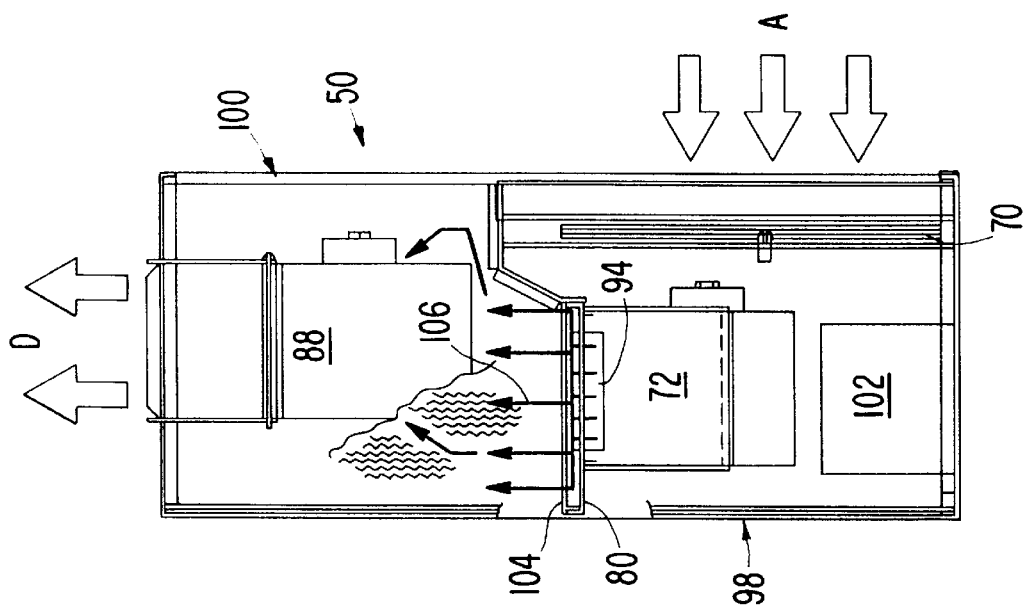
FIG. 4 is another side view, again broken away to disclose interior detail, that is a ninety degree perspective with respect to the view depicted in FIG. 3.
Figure 3:
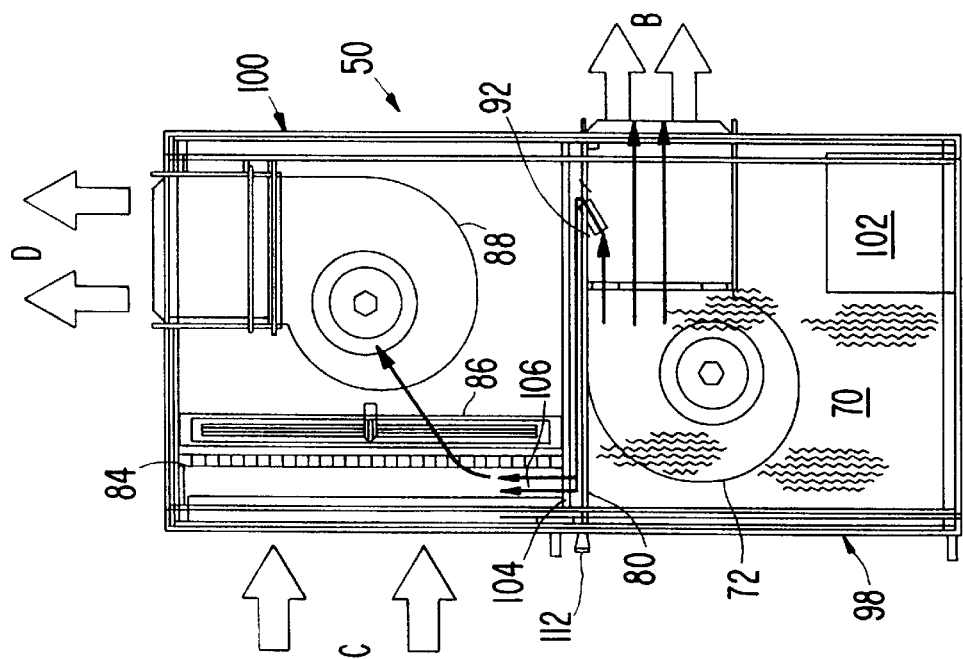
FIG. 3 is a side view, broken away to disclose interior detail, of a heat pump cabinet in accordance with the invention disclosing a lower outdoor air blower section and an upper indoor air blower section.

FIGS. 3 and 4 disclose broken away side views of the heat pump of a preferred embodiment of the invention. The heat pump cabinet 50 is separated by a dividing wall 80 into a lower outdoor air blower section 98 and an upper indoor air blower section 100.

The lower outdoor air blower section houses a compressor 102 for the heat pump system. Outdoor air is drawn into the lower section 98 by a radial vane blower 72. When the outdoor air is drawn in the direction of arrows "A" into the heat pump system, it first passes through and over the coils of heat exchange 70. During this inflow the outside air is heated by the condensing coil 70. The heated outside air then is drawn into the radial vane blower 72 and out of the heat pump in the direction of arrows "B".

The upper, indoor air, blower section 100 includes an air filter 84 and a cooling coil 86 and a radial vane blower 88. Indoor return air enters the upper section 100 in the direction of arrows "C" and is filtered, cooled, and exits in the direction of arrows "D".

An aperture 92 is fashioned through the dividing wall 80 and a variable angle diverting plate 94 deflects heated and pressurized outdoor air downstream of the blower 72 and into a plenum chamber 104. The heated and pressurized outdoor air travels through the plenum 104 and exits in the direction of arrows 106 upstream of the air filter 84 in the upper chamber 100.

Turning now to FIG. 5, note again sheet 2, it will be seen that the diverting plate 94 is pivotally mounted adjacent the aperture 92. Angular motion of the diverting plate 94 can be controlled by a number of mechanical linkages. One system includes a rod 108 that is threaded through a mounting 110 and terminates with an adjustment knob 112.

In operation, the angle of the diverting plate 94 is regulated for an individual house or building by rotation of the control 112. Heated and pressurized outdoor air is then delivered into the plenum chamber 104 and diverted to a position in the indoor air blower section 100 upstream of the filter 84 and cooling coil 86 for delivery into the interior of the house or enclosure for maintaining a positive pressure within the enclosure.

SUMMARY OF MAJOR ADVANTAGES OF THE INVENTION

The inventive positive pressure variable, heat pump provides advantages previously not known in connection with heat pump and other air handling units. In particular, the instant invention uses heated outside air, downstream from a condensing coil, and pressurizes the heated air by a radial vane exhaust blower. A variable, positive pressure, diverting plate, is introduced into the exhaust stream and diverts a portion of the heated exhaust to either increase or decrease the amount of pressure within a building or home structure. The unit generates the pressurized exhaust by using a radial vane, outdoor air blower to pull outside air through a condensing coil where the air is heated and then pressurized by the blower. In turn, an inside air blower receives both diverted pressurized exhaust and re-circulating indoor air which are both cooled by a cooling coil of the heat pump. This results in re-circulating indoor air that is pressurized higher than atmospheric pressure. This positive pressure air environment restricts pollutants from entering the building.

The present invention offers several major advantages over previous heat pump units. In particular, the novelty of the present positive pressure (variable), heat pump invention lies in the variable positive pressure diverting plate, wherein the diverting plate utilizes pressurized exhaust outside air to regulate the amount of pressure within a structure. The subject heat pump is self contained and the condensing unit is within the unit interior within a building, accordingly the outdoor noise associated with operation of an outdoor condenser is eliminated.

The indoor positive pressure created by the subject heat pump system and method reduces the tendency of air born dust, pollen and spores from entering a building environment through windows, doors, fireplaces, etc. Similarly, the interior positive pressure provided by the subject heat pump system and method reduces the tendency of radon gas to enter into the building atmosphere.

In describing the invention, reference has been made to preferred embodiments and illustrative advantages of the invention. Those skilled in the art, however, and familiar with the instant disclosure of the subject invention, may also recognize other additions, deletions, modifications, substitutions and/or other changes which will fall within the purview of the subject invention and claims.

What is claimed is:

1. A positive pressure heat pump for maintaining a positive interior pressure with respect to the ambient environment for a building structure, said heat pump including a compressor, a condensing coil and a cooling coil and further comprising:

an enclosed positive pressure heat pump cabinet having,
an outdoor air blower section housing said condensing coil,
an indoor air blower section housing said cooling coil, and
an air barrier within said cabinet dividing said outdoor air blower section from said indoor air blower section;

an outdoor air blower positioned within said outdoor air blower section of said positive pressure heat pump cabinet;

an outdoor air intake port positioned through a wall surface of said outdoor air blower section of said positive pressure heat pump cabinet upstream of said condensing coil;

an outdoor air outlet port positioned through a wall surface of said outdoor air blower section of said positive pressure heat pump cabinet;

said outdoor air blower being positioned within said positive pressure heat pump cabinet downstream of said condensing coil and upstream of said outdoor air outlet port, and being operable for drawing outdoor air through said condensing coil and pushing outdoor air out of said outdoor air outlet port at an elevated temperature with respect to ambient outdoor air drawn into said outdoor blower section of said pressure heat pump cabinet;

an indoor air blower positioned within said indoor blower section of said positive pressure heat pump cabinet;

an indoor air intake port positioned through a wall surface of said indoor blower section of said positive pressure heat pump cabinet and upstream of said cooling coil;

an indoor air outlet port positioned within said positive pressure heat pump downstream of said cooling coil and upstream of said indoor air outlet port and being operable for drawing indoor air through said cooling coil thus cooling the indoor air drawn into said indoor blower section of said positive pressure heat pump cabinet and pushing the cooled indoor air out of said indoor air outlet port at a temperature cooler than the temperature of the indoor air drawn into said indoor blower section of said positive pressure heat pump cabinet;

means for diverting outdoor air from a position downstream of said condensing coil and said outdoor blower within said outdoor blower section of said positive pressure heat pump cabinet, which outdoor air is at an elevated pressure and temperature relative to ambient outdoor air pressure and temperature; and means for introducing the outdoor air diverted from a position downstream of said condensing coil and said outdoor air blower within said outdoor air blower section to a position upstream of said cooling coil within said indoor air blower section of said positive pressure heat pump cabinet, wherein air at a temperature cooler than indoor inlet air temperature and at a pressure greater than indoor inlet air pressure is delivered from said positive pressure heat pump cabinet and into the building structure atmosphere.

2. A positive pressure heat pump for a building structure as defined in claim 1 wherein said means for diverting outdoor air comprises:

an air diverting plate extending into the outdoor air stream downstream of said outdoor air blower for diverting outdoor air at an elevated temperature and pressure from said outdoor air blower section of said positive pressure heat pump cabinet through an aperture through said barrier within said cabinet dividing said outdoor air blower section from said indoor air blower section and into said indoor air blower section of said positive pressure heat pump cabinet.

3. A positive pressure heat pump for a building structure as defined in claim 2 wherein said means for diverting outdoor air further comprises:

a plenum chamber within said indoor air blower section positioned downstream of said aperture through said barrier and upstream of said cooling coil to distribute outside air diverted from said outside air blower section over said cooling coil within said inside air blower section.

4. A positive pressure heat pump for a building structure as defined in claim 2 wherein:

said air diverting plate being adjustable and operable to extend into the outdoor air stream downstream of said outdoor air blower at a variable angle so that the amount of air at an elevated pressure and temperature diverted from said outdoor air blower section of said positive pressure heat pump cabinet to said indoor air blower section of said positive pressure heat pump cabinet may be selectively controlled.

5. A positive pressure heat pump for a building structure as defined in claim 3 and further comprising:

an air filter positioned downstream of the aperture admitting outdoor air from said outdoor air from said outdoor air blower section into said indoor air blower section and upstream of said cooling coil in said indoor air blower section.

6. A positive pressure heat pump for a building structure as defined in claim 2 and further comprising:

an outdoor air plenum extending from the aperture through said barrier within said cabinet dividing said indoor air blower section from said outdoor air blower section to a position upstream of said cooling coil in said indoor air blower section.

7. A positive pressure heat pump for a building structure as defined in claim 5 and further comprising: an air filter positioned downstream of said outdoor air plenum and upstream of said cooling coil of said indoor air blower section of said positive pressure heat pump.

8. A positive pressure heat pump for a building structure as defined in claim 5 wherein:

said air diverting plate being pivotally mounted adjacent to said aperture in said interior barrier dividing said outdoor air blower section from said indoor air blower section and being mounted to operably adjust the angle of said diverting plate with respect to said aperture to selectively control the amount of outdoor air introduced into said indoor air blower section and thus regulate the positive air pressure within a building structure.

9. A method for maintaining a positive pressure with respect to an ambient environment for providing a positive pressure environment within a building structure, with a heat pump system, comprising the steps of:

maintaining within the interior of a building structure a heat pump having an enclosed cabinet with an outdoor air blower section including a condensing coil and an outdoor air blower and an indoor air blower section including a cooling coil and an indoor air blower section;

using the outdoor air blower, drawing outside air into said outdoor air blower section over and through said condensing coil for cooling fluid within the compressor coil and transferring heat to the outdoor air;

expelling the heated outdoor air to the atmosphere outside of said building structure;

using the indoor air blower, drawing air into said indoor air blower section from within the interior of the building structure, over and through the cooling coil for cooling the indoor air temperature;

expelling the cooled indoor air back into the interior of the building structure; and downstream of the condensing coil and the outdoor air blower, diverting a portion of the heated outdoor air from the outdoor air blower section into the indoor air blower section upstream of the cooling coil and thereby increasing the pressure within the building structure to a pressure greater than the ambient pressure surrounding the building structure.

10. A method for providing a positive pressure within a building structure, with a heat pump, as defined in claim 9, wherein said step of diverting comprises:

selectively varying the amount of heated outside air diverted into the indoor air blower section from the outdoor section to control the degree of positive pressure within the interior of the building structure.

11. A method for providing a positive pressure within a building structure, with a heat pump, as defined in claim 9 wherein said step of selectively varying the amount of heated air diverted into the indoor air blower section comprises:

selectively varying the angle of a diverting plate position within the stream of heated and pressurized outside air downstream of said outside air blower to divert heated and pressurized outside air into said inside air blower section upstream of said cooling coil in said inside air blower section.

12. A method for providing a positive pressure within a building structure, with a heat pump, as defined in claim 9 and further comprising the step of:

filtering the diverted outside air within said indoor air blower section upstream of said cooling coil within said inside air blower section.

13. A method for providing a positive pressure within a building structure, with a heat pump, as defined in claim 9 and further comprising the step of:

impeding the amount of air born dust, pollen and spores that might enter the interior of the building structure by constantly maintaining a positive pressure within the interior of the building structure with a heat pump within the building structure.

14. A method for providing a positive pressure within a building structure, with a heat pump, as defined in claim 9 and further comprising the step of:

retarding the passage of radon gas that might enter the interior of the building structure by constantly maintaining a positive pressure within the interior of the building structure with a heat pump within the building structure.

* * * * *